(12) United States Patent
Harel

(10) Patent No.: US 9,354,643 B2
(45) Date of Patent: May 31, 2016

(54) SMART DIMMING SOLUTION FOR LED LIGHT BULB AND OTHER NON-LINEAR POWER AC LOADS

(71) Applicant: Renesas Electronics America Inc., Santa Clara, CA (US)

(72) Inventor: Jean Claude Harel, San Jose, CA (US)

(73) Assignee: Renesas Electronics America Inc., Santa Clara, CA (US)

( * ) Notice: Subject to any disclaimer, the term of this patent is extended or adjusted under 35 U.S.C. 154(b) by 0 days.

(21) Appl. No.: 13/748,989

(22) Filed: Jan. 24, 2013

(65) Prior Publication Data

US 2013/0187623 A1 Jul. 25, 2013

Related U.S. Application Data

(60) Provisional application No. 61/590,184, filed on Jan. 24, 2012.

(51) Int. Cl.
*G05F 1/44* (2006.01)
*H02M 5/257* (2006.01)
*H02M 5/293* (2006.01)
*H05B 33/08* (2006.01)
*H02M 1/08* (2006.01)
*H02M 1/00* (2006.01)

(52) U.S. Cl.
CPC .............. *G05F 1/44* (2013.01); *H02M 5/2573* (2013.01); *H02M 5/293* (2013.01); *H05B 33/0815* (2013.01); *H05B 33/0845* (2013.01); *H02M 1/083* (2013.01); *H02M 2001/0032* (2013.01); *H02M 2001/0048* (2013.01); *Y02B 70/1491* (2013.01); *Y02B 70/16* (2013.01)

(58) Field of Classification Search
None
See application file for complete search history.

(56) References Cited

U.S. PATENT DOCUMENTS

| 6,347,028 | B1 * | 2/2002 | Hausman et al. | 361/93.1 |
|---|---|---|---|---|
| RE42,425 | E | 6/2011 | DeJonge et al. | 315/225 |
| 2006/0273775 | A1 * | 12/2006 | Dobbins et al. | 323/288 |
| 2007/0001654 | A1 * | 1/2007 | Newman, Jr. | 323/235 |
| 2007/0159153 | A1 * | 7/2007 | Fricke et al. | 323/288 |
| 2009/0121781 | A1 * | 5/2009 | Oyama et al. | 327/536 |
| 2012/0019714 | A1 * | 1/2012 | Hiramatu et al. | 348/370 |

* cited by examiner

*Primary Examiner* — Timothy J Dole
*Assistant Examiner* — Monica Mata
(74) *Attorney, Agent, or Firm* — Campbell Stephenson LLP

(57) ABSTRACT

A dimmer is provided that includes an MCU, a first power switch, and a pair of second power switches. The MCU is coupled to and configured to control the first power switch and the pair of second power switches, wherein the MCU is configured to activate the first power switch to conduct current to a load during a first continuous period of time. The MCU is also configured to alternately activate the pair of second power switches to conduct current to the load during a second continuous period of time. The MCU is configured to deactivate the pair of second power switches during the entire first period of time, and the MCU is configured to deactivate the first power switch during the entire first period of time. The first and second continuous periods do not overlap in time.

18 Claims, 4 Drawing Sheets

US 9,354,643 B2

SMART DIMMING SOLUTION FOR LED LIGHT BULB AND OTHER NON-LINEAR POWER AC LOADS

RELATED APPLICATIONS

This application claims domestic benefit under Title 35 of the United States Code §119(e) of U.S. Provisional Patent Application Ser. No. 61/590,184, entitled "Smart Dimming Solution for LED Light Bulb and Other Non-Linear Power AC Loads," filed Jan. 24, 2012, and naming Jean Claude Harel as the inventor, which is hereby incorporated by reference in its entirety and for all purposes as if completely and fully set forth herein.

BACKGROUND OF THE INVENTION

Dimmers are variable voltage devices or devices that can adjust the root mean square (RMS) voltage delivered to loads such as light emitting diode (LED) bulbs, florescent lamps, incandescent/halogen bulbs, fans, small electric motors, etc. By decreasing or increasing the RMS voltage and, hence, the mean power to the load, it is possible to vary operational aspects of the load. For example, dimmers can be used to vary the RMS voltage delivered to an LED light bulb, which in turn can vary the intensity of light output from the LED light bulb.

SUMMARY OF THE INVENTION

A dimmer is provided that includes, in one embodiment, a first power switch, a pair of second power switches, and a micro control unit (MCU). The MCU is coupled to and configured to control the first power switch and the pair of second power switches. The MCU is configured to activate the first power switch to conduct current to a load during a first continuous period of time. The MCU is configured to deactivate the pair of second power switches during the entire first period of time, and the MCU is configured to deactivate the first power switch during the entire second period of time. The first and second continuous periods do not overlap in time.

BRIEF DESCRIPTION OF THE DRAWINGS

The present disclosure may be better understood, and its numerous objects, features, and advantages made apparent to those skilled in the art by referencing the accompanying drawings.

DETAILED DESCRIPTION

Dimmers employ different technologies. Triode-for-alternating current (TRIAC) dimmers are common. The TRIACs in these dimmers typically activate (i.e., switch on) and conduct current to a load after the start of each half-cycle of an alternating current (AC) line voltage source, thereby altering the voltage waveform applied to the load and so changing the voltage's RMS effective value. The time or phase angle at which the TRIAC activates can be varied based on user input via a mechanical component such as a wall-mounted slider. Because TRIACs mainly switch instead of absorbing part of the line voltage supplied to it, there is very little power wasted by the dimmer when compared to other types of dimmers. Power consumption is significant factor in the design of dimmers.

The TRIAC is a semiconductor triode that features two terminals and a gate. It may help to think of the TRIAC as two silicon controlled rectifiers (SCRs), which are a type of thyristor, placed back to back. A typical SCR has four layers of alternating P-type and N-type semiconductor material. An SCR deactivates when no current is flowing through it, and it can be activated when a current is applied to its gate. An SCR conducts current in a single direction, but a TRIAC is bidirectional and can conduct current in either direction between its two terminals, which is why a TRIAC looks like two SCRs.

Figure 1:
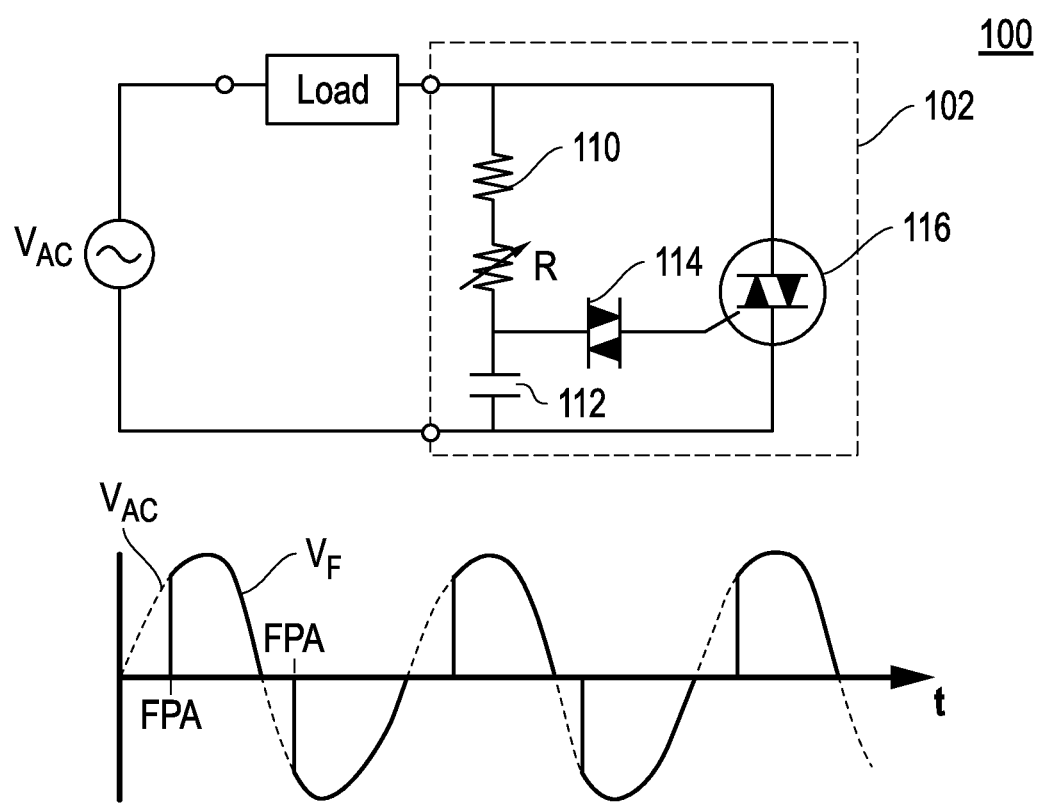
FIG. 1 is a block diagram illustrating a system employing an example dimmer.

Because TRIACs deactivate when there is no current flowing through them, TRIAC based dimmers have been a popular household solution for use with incandescent light bulbs. TRIAC dimmers take advantage of AC sine waves provided by a line voltage source, which have zero voltage twice during each cycle. The TRIAC will deactivate at each zero voltage crossing of the AC line voltage source. In the United States, there are 60 such cycles per second, so that the TRIAC deactivates 120 times each second. A firing capacitor is typically provided and serves as a source of current to activate a TRIAC. When a wall-mounted slider of the dimmer is turned low, current flow to the capacitor slows, and therefore it takes more time to charge the firing capacitor and subsequently activate the TRIAC, effectively chopping the AC sine wave FIG. 1 illustrates an example dimmer 102 that employs a TRIAC for controlling AC voltage delivery to a load. System 100 includes a line voltage source that generates an AC voltage $V_{AC}$. It should be noted that the term dimmer should not be limited to that shown in FIG. 1.

Dimmer 102 includes a variable resistor R, the resistance of which can be varied by a user via a mechanical component (not shown) such as a wall-mounted slider. Variable resistor R is coupled in series to resistor 110, the combination of which is coupled to a firing capacitor 112 as shown. A diode-for-alternating current (DIAC) 114 is coupled between capacitor 112 and a gate of TRIAC 116. A DIAC is a diode that activates and conducts current only after its break-over voltage has been reached. When this occurs, there should be a decrease in the voltage drop across the DIAC and, usually, a sharp increase in current flow through the DIAC. The DIAC remains on until the current drops below a value, called a DIAC holding current. Below this value, the DIAC switches back to its high-resistance (non-conducting) or off state. Like the TRIAC, the DIAC is a bidirectional device.

A minimum amount of current (latching current) is required to latch TRIAC 116 in the on state when the TRIAC is first triggered by the injection of current (hereinafter a triggering pulse) into the gate via DIAC 114. Moreover, a minimum amount of current (holding current) is required to maintain the TRIAC in the conducting state after it is triggered. TRIAC 116 will deactivate when the current flow through the TRIAC drops below the holding current, which occurs at or near each zero voltage crossing of $V_{AC}$.

Typical TRIAC based dimmers can adjust the RMS of voltage delivered to a load through forward phase angle control as briefly mentioned above. To illustrate, as the magnitude of $V_{AC}$ increases from zero volts at the start of a half cycle, capacitor 112 charges via current flow through resistor 110 and variable resistor R. When the voltage on capacitor 112 exceeds the break over voltage of DIAC 114, DIAC 114 activates and begins conducting current to the gate of TRIAC 116, which in turn activates TRIAC 116. DIAC 114 stays active for a short period of time while discharging capacitor 112. Eventually the voltage across DIAC 114 drops and it deactivates, which terminates current flow to the gate of TRIAC 116. If the current flow between the collector and emitter of TRIAC 116 exceeds its minimum latching current when the current flow into the gate terminates, TRIAC 116 will remain active and continue to conduct current to load 104. TRIAC 116 will also continue to conduct current so long as the TRIAC holding current is exceeded. The current flow through TRIAC 116 will eventually fall below the holding current as the magnitude of $V_{AC}$ drops toward zero volts near the end of the half cycle, at which point TRIAC 116 will deactivate. A similar process repeats for the next positive or negative AC half cycle.

FIG. 1 illustrates voltage waveforms that further illustrate the process of forward phase angle control. FIG. 1 includes a visual representation of $V_{AC}$ and the chopped, forward phase angle controlled voltage $V_F$ provided to the terminals of the load while TRIAC 116 activates and deactivates as described above. TRIAC 116 activates with each triggering pulse of DIAC 114 as described above. A time constant is formed by capacitor 112 and the series combination of variable resistor R and resistor 110. The forward phase angle (FPA) at which DIAC 114 triggers TRIAC 116 depends on the time constant, which can be adjusted by changing the resistance of variable resistor R. One of ordinary skill in the art understands that $V_F$ can be clipped at different phase angles than that shown in FIG. 1 by adjusting the resistance of variable resistor R.

TRIAC dimmers work well with linear loads such as incandescent or halogen lights. Unfortunately, TRIAC dimmers may not be compatible with non-linear loads such LED light bulbs. To illustrate by way of an example, presume the load shown in FIG. 1 takes form in an LED light bulb. Light emitting diodes within typical LED light bulbs are powered with constant current/constant voltage (CC/CV). To achieve this, LED light bulbs typically include a controller (not shown) that provides the constant current/constant voltage using the chopped voltage $V_F$ provided by dimmer 102. To achieve dimming, the controller reads the input voltage phase and adapts the converter high frequency duty cycle to reduce the power delivered to the light emitting diodes. One consequence is that the LED light bulb dimming range depends on the dynamic range of the controller within the LED light bulb and not on the dimmer itself. If the dimmer 102 outputs $V_F$ to the LED light bulb having a duty cycle of 50% or if the dimmer outputs $V_F$ to the LED light bulb having a duty cycle of 25%, a difference in light output may not be perceivable by the human eye. In other words, a user may not notice a perceptible difference in the light output as the user adjusts down the variable resistor R until an under-voltage circuitry (not shown) of the controller kicks in, at which point the LED converter turns off and no light is generated. To resolve this problem, the controller may include a circuit such as a microcontroller that reads the phase angle of $V_F$ and adapts the converter to reduce the power delivered to the light emitting diodes, which results in perceivable dimming. Unfortunately, this means the dimming range for the LED light bulb is dependent upon the dynamic range of the LED controller and not dimmer 102.

While dimming LED light bulbs, it is not uncommon to reduce the power applied to the LED light bulb by 99% or more in order to achieve a comparable dimming effect that one would experience when dimming incandescent light bulbs. As the user continues to reduce power provided to an LED light bulb, the current flow through TRIAC will fall accordingly. At some point the current may fall below the TRIAC's holding current, or there will not be enough current to latch the TRIAC when the DIAC pulses. When this occurs, TRIAC 116 may prematurely deactivate or not trigger at all, and the power delivered to the load is interrupted. This can lead to a condition known as "flickering."

Flickering can be avoided if at critical points the current flow through the TRIAC is maintained above the minimal latching and holding values. In many situations, maintaining TRIAC current above a minimum holding or latching value to avoid problems can be impractical.

Figure 2:
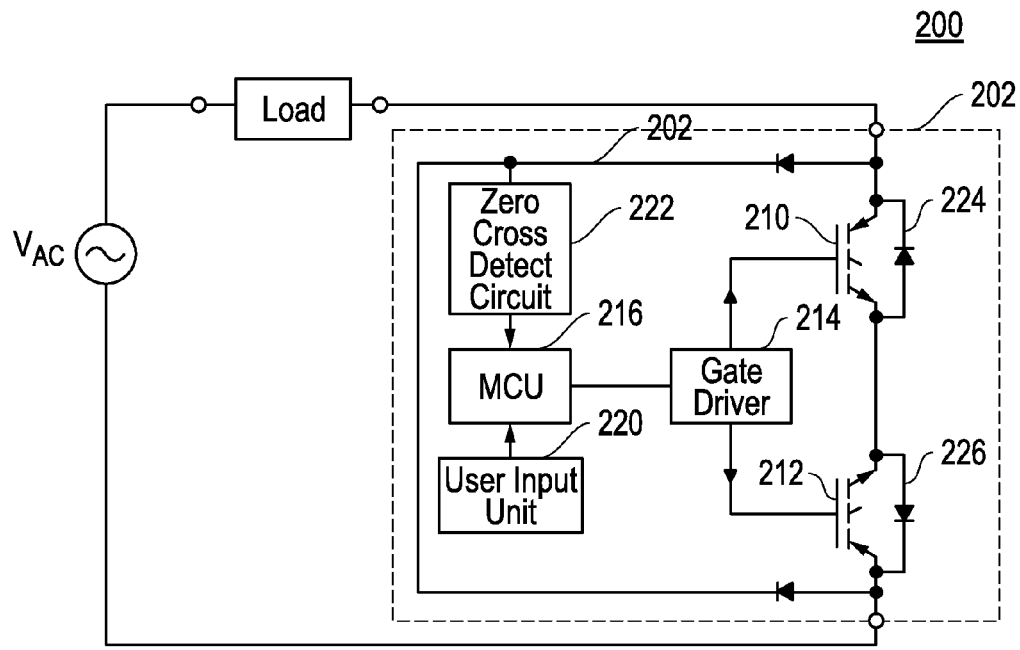
FIG. 2 is a block diagram illustrating a system employing another example dimmer.
Figure 2:
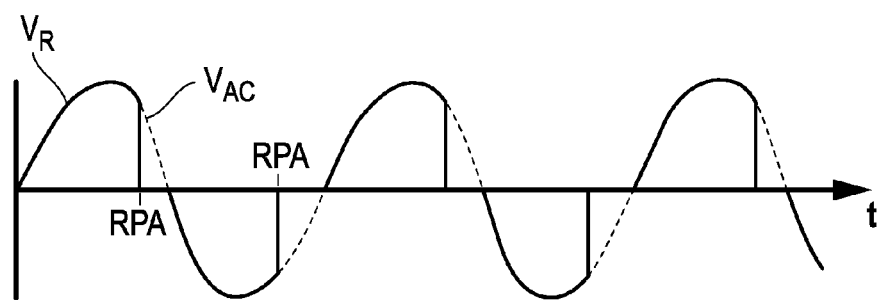

Most TRIAC dimmers employ forward phase angle control of voltage provided to loads. Alternative dimmers can employ reverse phase angle control, also called trailing edge dimming, in which $V_{AC}$ is chopped off at a predetermined phase angle prior to each zero volt crossing of the $V_{AC}$ half cycle. FIG. 2 illustrates a system 200 with a dimmer 202 that employs reverse phase angle control. The reverse phase control dimmer 202 shown within FIG. 2 may be more suitable for nonlinear loads when compared to TRIAC based, forward phase control dimmers like dimmer 102 shown within FIG. 1.

Dimmer 202 includes a pair of power switches 210 and 212, which may take form in metal oxide semiconductor field effect transistors (MOSFETs), insulated-gate bipolar transistors (IGBTs), etc. For purposes of explanation only, dimmer 202 will be described with power switches 210 and 212 in the form of IGBTs, it being understood the present invention should not be limited thereto.

An IGBT is a three-terminal power device primarily used as an electronic switch. The IGBT combines the simple gate-drive characteristics of MOSFETs with the high-current and low-saturation-voltage capability of bipolar transistors by combining an isolated gate FET for the control input, and a bipolar power transistor as a switch, in a single device. While IGBT is generally considered a low power consumption switch, IGBTs may consume more power than TRIACs.

Gates of IGBTs 210 and 212 are driven by driver 214, which in turn is subject to control by a microcontroller 216 that operates in accordance with executable instructions stored within memory thereof. Dimmer 202 may include a user input unit 220 that enables a user to adjust the RMS of the voltage provided to load via, for example, a wall-mounted slider (not shown). Lastly, dimmer 202 includes a zero volt crossing detection circuit 222 that detects when $V_{AC}$ crosses zero volts. FIG. 2 also shows wave forms illustrating the reverse phase angle control aspects of dimmer 202. In particular, FIG. 2 shows $V_{AC}$ and the chopped, reverse phase angle controlled voltage $V_R$ delivered to the load.

In operation, microcontroller 216 activates IGBT 210 or 212 in response to the zero cross detection circuit detecting that $V_{AC}$ has crossed zero volts. IGBTs 210 and 212 are unidirectional devices or devices through which current flows in only one direction. In contrast, TRIAC 116 shown within FIG. 1 is a bidirectional device or a device through which current flows in both directions. In the positive half of the cycle of $V_{AC}$, current can flow through activated IGBT 210 and diode 226, but not IGBT 212 or diode 224. In the negative half of the $V_{AC}$ cycle, current can flow through activated IGBT 212 and diode 224, but not IGBT 210 and diode 226. Between zero volt crossings of $V_{AC}$, microcontroller 216 can deactivate IGBTs 210 and 212 based upon a signal provided by user input unit 220. When deactivated, current cannot flow through IGBT 210 or IGBT 212. The diodes 222 and 224 are configured so that no current can flow to or from the load as well. This leads to the sudden drop in $V_R$ at the reverse phase angles (RPA) as shown in FIG. 2. The RPA can be adjusted to an earlier or later point based on input received from a user via user input unit 220. In contrast to TRIAC 116, there is no concern with maintaining a minimum amount of current before or during activation of IGBTs 210 and 212.

The IGBT based dimmer 202 enables reverse phase or forward phase control. While there is no need to meet minimum current thresholds, dimmer 202 nonetheless presents at least one disadvantage when compared to dimmer 102 of FIG. 1; IGBTs 210 and 212 may consume more power in comparison to the power consumed by TRIAC 116 shown within FIG. 1. An increase in power consumption can result in operating temperatures that exceed limits set by the specification for dimmer 202.

Figure 3:
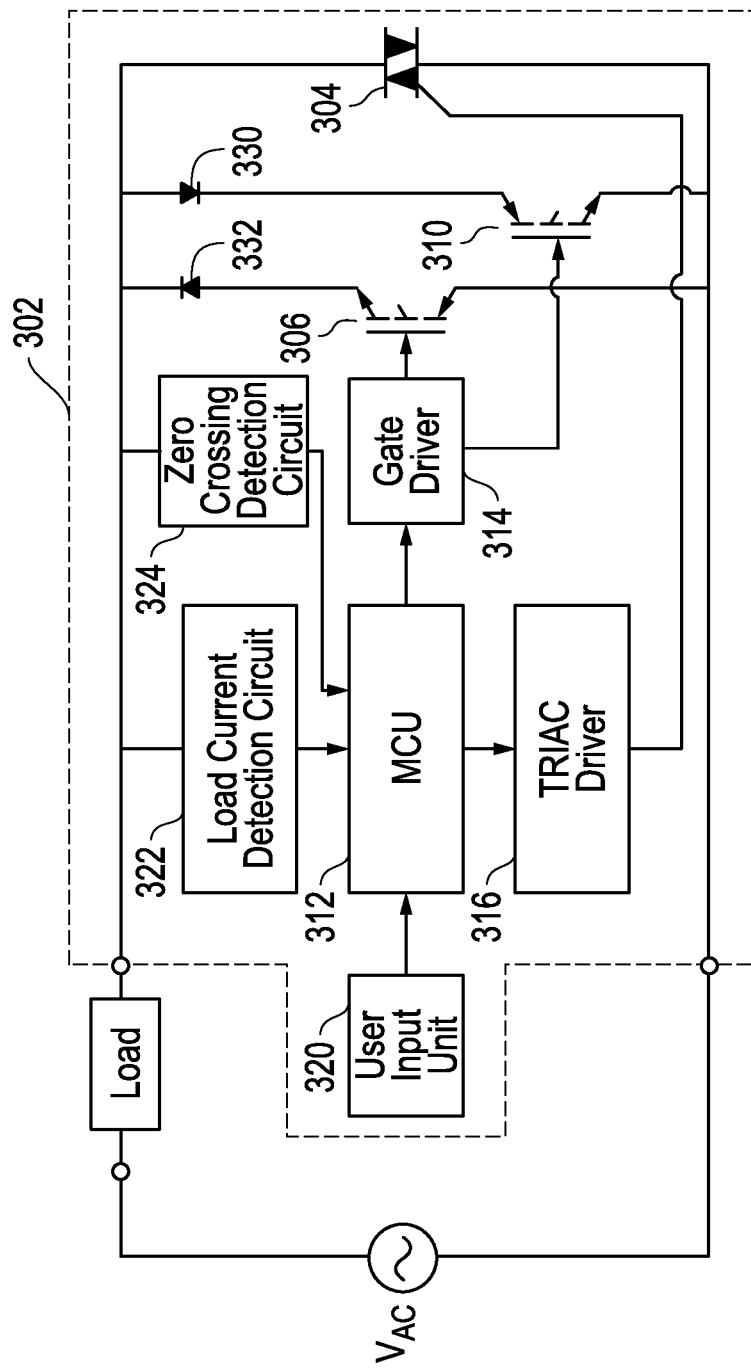
FIG. 3 is a block diagram illustrating a system employing yet another example dimmer.

FIG. 3 illustrates an alternative dimmer 302 that employs a TRIAC 304 and IGBTs 306 and 310. Dimmer 302 is capable switching between at least three distinct modes of operation. A first mode is implemented when current flow to the load significant. In this first mode the current flows solely through TRIAC 304 in both the positive and negative cycles of $V_{AC}$, while IGBTs 306 and 310 remain deactivated. A second mode is implemented when current flow to the load is low. This this second mode the current flows solely through IGBT 306 or IGBT 310, depending on the cycle of $V_{AC}$, while TRIAC 304 remains deactivated. In the third or intermediate mode, TRIAC 304, IGBT 306 and IGBT 310 are selectively activated and can selectively operate in a forward or reverse phase control embodiment. In this third mode, the majority of current flows to the load through activated TRIAC 304, but TRIAC 304 can be deactivated before a zero volt crossing by $V_{AC}$ during either the positive or negative cycle. In this mode, TRIAC 306 is deactivated when IGBT 306 or IGBT 310 is activated for a very short period of time. An activated IGBT 306 or 310 in essence electrically shorts TRIAC 306, which in turn starves TRIAC 306 of the minimal holding current needed to maintain conduction.

As illustrated in FIG. 3, dimmer 302 includes TRIAC 304 and IGBTs 306 and 310. Additionally, dimmer 302 includes a microcontroller (MCU) 312 that is capable of controlling IGBTs 306 and 310 via gate driver 314, and TRIAC 304 via TRIAC driver 316 in accordance with instructions stored in memory and in accordance with signals provided by a load current detection circuit 322, a zero crossing detection circuit 324, and/or a user input circuit 320. The user input circuit 320 may generate a signal proportional to the position of a slider (not shown) mounted on a wall. MCU may contain a processor that executes the instructions that are stored in memory.

TRIAC 304 will consume less power than IGBT 306 or 310 when conducting the same amount of current. Load current detection circuit 322 measures the magnitude of current flow to the load and generates a periodic signal that is proportional thereto. Zero crossing detection circuit 324 generates a signal each time $V_{AC}$ crosses zero volts. The user input circuit 320 may generate a signal proportional to the position of a slider (not shown) mounted on a wall. These signals are received and processed by MCU 312 in accordance with instructions of an algorithm that adapts the behavior of dimmer 302, for example, to minimize power consumption or to avoid flickering when used with an LED light bulb as the load.

Figure 4:
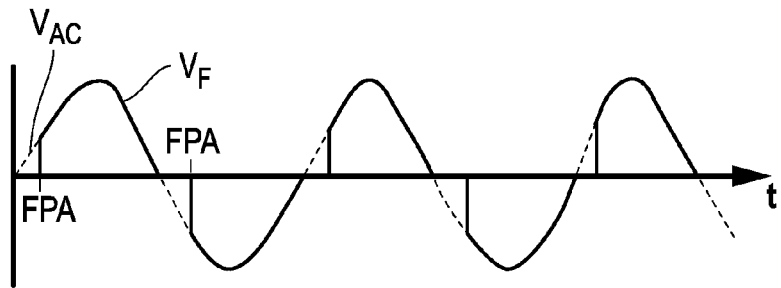
FIG. 4 graphically illustrates example voltage waveforms generated in the system of FIG. 3 operating in a first mode.

If MCU 312 detects (via load current detection circuit 322) that the load is consuming a current that exceeds a first threshold $P_H$, MCU 312 may deactivate IGBTs 306 and 310 for all cycles of $V_{AC}$ in favor of operating TRIAC 304 in forward phase angle control. In this first mode of operation, MCU 312 activates TRIAC 304 via driver 314 during each half cycle of $V_{AC}$ via driver 316 in accordance with the signal received from user input unit 320. FIG. 4 illustrates $V_{AC}$ and the reverse phase angle controlled $V_F$ provided to the load in this mode of operation. As seen in FIG. 4, $V_{AC}$ is chopped at the FPA shortly after each zero crossing. The FPA in this mode of operation can vary with a change in the signal from user input unit 320. TRIAC 304 remains activated until a subsequent zero volt crossing as shown in FIG. 4. In this first mode, IGBTs 306 and 310 remain deactivated for all cycles of $V_{AC}$.

Dimmer 302, under control of MCU 312, is capable switching to the second mode of operation in which TRIAC 304 is deactivated for all cycles of $V_{AC}$. In this second mode of operation current to the load is delivered solely through IGBTs 306 or 310. Dimmer 302 enters this second mode of operation when MCU 312 receives a signal from load current detection circuit 322 indicating that the current provided to the load is below a second threshold $P_L$, which is less than $P_H$.

Figure 5A:
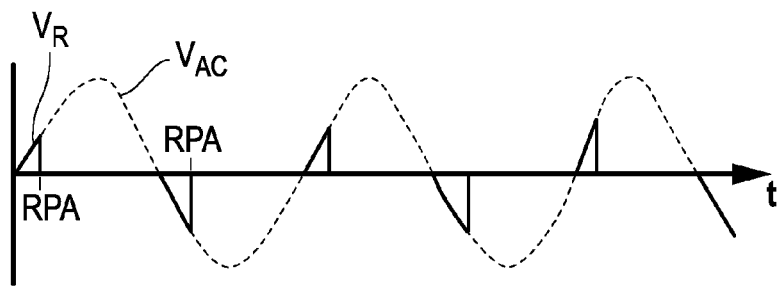
FIGS. 5A and 5B graphically illustrate examples voltage waveforms generated in the system of FIG. 3 operating in a second mode.
Figure 5B:
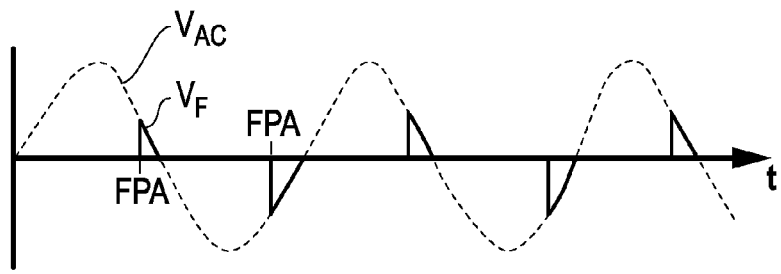

In second mode of operation, MCU 312 controls IGBTs 306 and 310 via TRIAC driver 316 in accordance with a signal received from the user via user input unit 320. This leads to forward or reverse phase control of the voltage provided to the load. FIG. 5A illustrates an example reverse phase control voltage $V_R$ provided to the load, while FIG. 5B illustrates an example forward phase controlled voltage $V_F$ provided to the load.

In one embodiment of the reverse phase control implementation of the second mode of operation, MCU 312 activates IGBTs 306 and/or 310 via driver 314 when MCU 312 receives an indication from the zero crossing detection circuit 324 that $V_{AC}$ has crossed zero volts. MCU 312 deactivates IGBTs 306 and 310 at the RPA in accordance with a signal received from user input unit 320. The RPA can change based on a change of signal provided by user input unit 320. IGBTs 306 and 310, like the IGBTs shown in FIG. 2, are unidirectional and can transmit current in only one direction. In the positive phase of $V_{AC}$ current is transmitted through diode 330 and activated IGBT 310. However, because of the configuration in which diode 332 and IGBT 306 are placed, current does not flow through IGBT 306 or diode 332 during the positive cycle of $V_{AC}$. During the negative cycle of $V_{AC}$ current flows through activated IGBT 306 to the load via diode 332. IGBT 310 and diode 330 do not conduct current within dimmer 302 during the negative cycle. Because these IGBTs are activated for a relatively short period of time (i.e., between the zero volt crossing and the RPA), they consume relatively little power.

In one embodiment of the forward phase control implementation of the second mode of operation, MCU 312 activates IGBTs 306 and/or 310 in accordance with a signal received from the user input unit 320, and deactivates IGBTs 306 and 310 when zero crossing detection circuit 324 detects a zero volt crossing by $V_{AC}$. The FPA can change based on a change of signal provided by user input unit 320. Because these IGBTs are activated for a relatively short period of time, they consume relatively little power. Again, it is noted that TRIAC 304 is not activated in this second mode of operation. Accordingly, there is no concern regarding adverse effects due to a lack of latching current or holding current.

As noted above, dimmer 302 can operate in the third mode in which TRIAC 304, IGBT 306 and IGBT 310 are selectively activated and deactivated by MCU 312. Dimmer 302 enters this third mode when the magnitude of current detected by the load current detection circuit 322 is between $P_H$ and $P_L$. In this third mode, current can be provided to the load primarily through TRIAC 304 in a forward phase or reverse phase angle control implementation.

Figure 6:
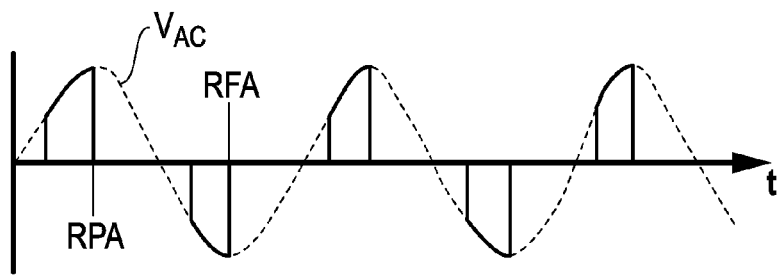
FIG. 6 graphically illustrates example voltage waveforms generated in the system of FIG. 3 operating in a third mode.

In one embodiment of the forward phase angle control implementation of the third mode, MCU provides a TRIAC triggering pulse to TRIAC 304 via driver 316 based on a signal provided by user input unit 320. TRIAC 304 activates with each TRIAC triggering pulse. The point in time at which the triggering pulse is delivered can be adjusted by a user via user input unit 320. TRIAC 306 is deactivated by MCU 312 via IGBT 306 or 310 when the current measured by load current detection circuit 322 drops below a threshold that exceeds the holding current value for TRIAC 306. For example, before the $V_{AC}$ crosses zero volts in the positive circle, MCU 312 can activate IGBT 310 via driver 314. Activated IGBT 310 essentially shorts activated TRIAC 304, which in turn deactivates TRIAC 304. The gate signal provided to IGBT 310 via driver 314 can be made substantially short (i.e., 100 microseconds) to minimize power consumption by activated IGBT 310. Likewise during the negative cycle of $V_{AC}$, MCU 312 can generate a short pulse that is provided to the gate of IGBT 306 via driver 314. This activates IGBT 306, which in turn essentially shorts TRIAC 304 and deactivates TRIAC 304. Again, the pulse width of the signal provided to IGBT 306 is short enough to minimize power consumption by IGBT 306. FIG. 6 illustrates an example waveform provided to the load in the forward phase angle control implementation of the third mode. In this forward phase implementation of the third mode of operation, TRIAC 304 consumes less power than would otherwise be consumed by IGBTs 306 or 310 if the same amount of current provided to the load were to flow through activated IGBTs 306 or 310.

In one embodiment of the reverse phase control implementation of the third mode, MCU provides a TRIAC triggering pulse to TRIAC 304 via driver 316 when the current measured by load current detection circuit 322 exceeds the latching current value for TRIAC 304. For example, after the $V_{AC}$ crosses zero volts in the each cycle, MCU 312 can activate TRIAC 304 via a triggering pulse provided by driver 316. During the positive cycle of $V_{AC}$ MCU 312 can deactivate TRIAC 304 by activating IGBT 310 via driver 314 in accordance with a signal provided by user input unit 320. When activated, IGBT 310 essentially shorts activated TRIAC 304, which in turn deactivates TRIAC 304. The gate signal provided to IGBT 310 via driver 314 can be made substantially short (i.e., 100 microseconds) to avoid any substantial power consumption by IGBT 310. During the negative cycle of $V_{AC}$, MCU 312 can generate a short pulse that is provided to the gate of IGBT 306 via driver 314. This activates IGBT 306, which in turn essentially shorts TRIAC 304, thereby deactivating TRIAC 304. Again, the pulse width of the signal provided to the IGBT 306 is short enough to minimize power consumption by IGBT 306.

Although the present disclosure has been described in connection with several embodiments, the disclosure is not intended to be limited to the specific forms set forth herein. On the contrary, it is intended to cover such alternatives, modifications, and equivalents as can be reasonably included in the scope of the disclosure as defined by the appended claims.

I claim:

1. A method comprising:
   comparing a first value to alternating current that is delivered to a load at a first point in time;
   in response to determining that the alternating current delivered to the load at the first point in time is greater than the first value, a first power switch transmitting the alternating current to the load during a first period of time, wherein the first power switch is activated after the start of each half cycle of the alternating current;
   comparing the first value to the alternating current that is delivered to the load at a second point in time;
   in response to determining that the alternating current delivered to the load at the second point in time is less than the first value, a pair of second power switches transmitting the alternating current to the load during a second period of time, wherein one of the pair of second power switches is activated at the start of each positive half cycle of the alternating current, and wherein the other of the pair of second power switches is activated at the start of each negative half cycle of the alternating current;
   wherein the first and second periods do not overlap in time;
   wherein the first power switch is not activated during the second period, and neither of the pair of second power switches is activated during the first period.

2. The method of claim 1 wherein the first power switch comprises a TRIAC, and at least one of the pair of second power switches comprises an IGBT.

3. The method of claim 1 wherein the load comprises an LED light bulb.

4. The method of claim 1 further comprising an act of comparing a second value with the alternating current that is delivered to the load at the second point of time, wherein the pair of second power switches transmits the alternating current to the load in response to determining that the alternating current delivered to the load at the second point of time is less than the second value.

5. The method of claim 1 further comprising:
   comparing the first value and a second value to the alternating current that is delivered to the load at a third point in time;
   in response to determining that the alternating current delivered to the load at the third point in time is less than the first value and greater than the second value, the first power switch transmitting the alternating current to the load during a third period of time, wherein the first power switch is activated after the start of each half cycle of the alternating current during the third period of time, and wherein the first power switch is deactivated when one of the pair of second power switches is activated after the start of each half cycle of the alternating current during the third period of time, wherein the first, second and third periods of time do not overlap with each other.

6. The method of claim 1 wherein the power device comprises a TRIAC and wherein the first value is related to a holding current value or a latching current value of the TRIAC.

7. An apparatus comprising:
   a first power switch for conducting alternating current when activated to a load;
   a pair of second power switches for conducting the alternating current when activated to the load;
   an MCU coupled to and configured to control the first power switch and the pair of second power switches;
   wherein the MCU is configured to activate the first power switch after the start of each half cycle of the alternating current during a first continuous period of time;
   wherein the MCU is configured to activate one of the pair of second power switches after the start of each positive half cycle of the alternating current during a second continuous period of time;
   wherein the MCU is configured to activate the other of the pair of second power switches after the start of each negative half cycle of the alternating current during the second continuous period of time;

wherein the MCU is configured to deactivate the pair of second power switches during the entire first continuous period of time;

wherein the MCU is configured to deactivate the first power switch during the entire second continuous period of time;

wherein the first and second continuous periods do not overlap in time.

8. The apparatus of claim 7 further comprising:

wherein the MCU activates and deactivates the first power switch during the first continuous period of time when the alternating current or voltage that is delivered to the load is greater than the first value;

wherein the MCU activates and deactivates the pair of second power switches during the second continuous period of time when the alternating current or voltage that is delivered to the load is less than the first value.

9. The apparatus of claim 8 wherein the MCU is configured to alternately activate the pair of second power switches to conduct the alternating current to the load during the second continuous period of time when the alternating current or voltage delivered to the load is less than a second value that is less than the first value.

10. The apparatus of claim 8 wherein the MCU activates and deactivates the first power switch and activates and deactivates at least one of the pair of second power switches during a third continuous period of time, wherein the first, second, and third continuous periods do not overlap with each other.

11. The apparatus of claim 7 wherein the MCU comprises a processor configured to execute instructions stored in memory.

12. The apparatus of claim 7 wherein the first power switch comprises a TRIAC.

13. The apparatus of claim 7 wherein at least one of the pair of second power switches comprises an IGBT.

14. The apparatus of claim 7 further comprising:

a second circuit for detecting when the alternating voltage or current provided to the load is equal to zero;

wherein the MCU activates a deactivated one of the second power switches during the second continuous time period when the second circuit detects the alternating current or voltage provided to the load is equal to zero.

15. The apparatus of claim 7 wherein the MCU is configured to activate the first power switch at a non-zero phase angle of each half cycle of the alternating current during the first continuous period of time.

16. The apparatus of claim 15 wherein, during the first continuous period of time, the first power switch is configured to deactivate at the end of each half cycle of the alternating current.

17. A method of controlling a flow of alternating current to a load, the method comprising:

during a first mode of operation, a TRIAC, when activated, transmitting the alternating current to the load, wherein the TRIAC activates after the start of each half cycle of the alternating current, and wherein the TRIAC deactivates at the end of each half cycle;

during a second mode of operation, first and second IGBTs, when activated, transmitting the alternating current to the load, wherein the first IGBT activates after the start of each positive half cycle of the alternating current, and wherein the second IGBT activates after the start of each negative half cycle of the alternating current;

during a third mode of operation the TRIAC, when activated, transmitting the alternating current to the load, wherein the TRIAC activates after the start of each half cycle of the alternating current, and wherein the TRIAC deactivates when at least one of the first and second IGBTs activates during each half cycle of the alternating current;

wherein the first and second IGBTs do not activate during the first mode;

wherein the TRIAC does not activate during the second mode.

18. The method of claim 17 wherein an RMS of the alternating current transmitted to the load during the first mode is greater than an RMS of the alternating current transmitted to the load during the second mode.

* * * * *